United States Patent
Mishael et al.

(10) Patent No.: US 11,917,430 B2
(45) Date of Patent: *Feb. 27, 2024

(54) DEVICE AND METHOD FOR HOLISTIC STEERING OF STATIONS IN A WIRELESS NETWORK WITH MULTIPLE ACCESS POINTS

(71) Applicant: AIRTIES BELGIUM SPRL, Woluwe-Saint-Lambert (BE)

(72) Inventors: Eli Mishael, Netanya (IL); Assi Abramovitz, Netanya (IL)

(73) Assignee: AIRTIES BELGIUM SPRL, Woluwe-Saint-Lambert (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,505

(22) Filed: Jun. 21, 2022

(65) Prior Publication Data
US 2022/0394510 A1 Dec. 8, 2022

Related U.S. Application Data

(63) Continuation of application No. 16/955,479, filed as application No. PCT/IL2017/051371 on Dec. 21, 2017, now Pat. No. 11,368,860.

(51) Int. Cl.
*H04W 24/02* (2009.01)
*H04W 8/02* (2009.01)
(Continued)

(52) U.S. Cl.
CPC ............ *H04W 24/02* (2013.01); *H04W 8/02* (2013.01); *H04W 24/08* (2013.01); *H04W 28/0861* (2023.05); *H04W 84/005* (2013.01)

(58) Field of Classification Search
CPC ............ H04W 24/02; H04W 28/0808; H04W 28/0861
See application file for complete search history.

(56) References Cited

U.S. PATENT DOCUMENTS

| 9,439,121 B2 | 9/2016 | Barreto de Miranda Sargento et al. |
| 10,015,737 B2 | 7/2018 | Colban et al. |

(Continued)

FOREIGN PATENT DOCUMENTS

| EP | 1015987 B1 * | 1/2004 | ......... H04L 41/0866 |
| WO | 2015073594 | 5/2015 | |
| WO | WO-2019123443 A1 * | 6/2019 | ............ H04W 24/02 |

OTHER PUBLICATIONS

Thomas Sandholm, Irene Macaluso, Sayandev Mukherjee, "WHO-IS: Wireless Hetnet Optimization using Impact Selection" Jun. 2023 (Year: 2023).*

(Continued)

*Primary Examiner* — William D Cumming
(74) *Attorney, Agent, or Firm* — Volpe Koenig (57) ABSTRACT

In a wireless network with a plurality of access points, device calculates, for each wireless station in the network, a score based on at least an availability of the wireless network for the wireless station, combines the scores for the wireless stations into a current network score for a present configuration of the wireless network, calculates a plurality of predicted network scores corresponding to predicted network configurations with one wireless station moved to a different access point than in the present configuration, each predicted network score being a combination of the scores for wireless stations not moved in the predicted network configuration and a predicted score for the wireless station moved in the predicted network configuration, selects one of the current network score and the plurality of predicted network scores that satisfies a criterion; and, in case a predicted network score is selected.

14 Claims, 3 Drawing Sheets

(51) Int. Cl.
  *H04W 24/08* (2009.01)
  *H04W 28/086* (2023.01)
  *H04W 84/00* (2009.01)

(56) References Cited

U.S. PATENT DOCUMENTS

| | | | |
|---|---|---|---|
| 10,028,213 B2 | 7/2018 | Colban et al. | |
| 11,006,282 B2 | 5/2021 | Magzimof et al. | |
| 11,089,534 B2 | 8/2021 | Jun et al. | |
| 11,368,860 B2* | 6/2022 | Mishael | H04W 24/02 |
| 2008/0320108 A1 | 12/2008 | Murty et al. | |
| 2015/0131483 A1 | 5/2015 | Colban et al. | |
| 2015/0319677 A1 | 11/2015 | Colban et al. | |
| 2015/0334598 A1 | 11/2015 | Duo et al. | |
| 2016/0150451 A1 | 5/2016 | Barreto de Miranda Sargento et al. | |
| 2017/0280337 A1 | 9/2017 | Bahr | |
| 2019/0028909 A1 | 1/2019 | Mermoud et al. | |
| 2019/0320328 A1 | 10/2019 | Magzimof et al. | |
| 2020/0178153 A1 | 6/2020 | Jun et al. | |
| 2020/0374714 A1* | 11/2020 | Mishael | H04W 28/0861 |
| 2021/0211900 A1 | 7/2021 | Pius et al. | |
| 2021/0235281 A1 | 7/2021 | Magzimof et al. | |
| 2022/0394510 A1* | 12/2022 | Mishael | H04W 28/0808 |

OTHER PUBLICATIONS

Moura et al., "Automatic Quality of Experience Management for WLAN Networks using Multi-Armed Bandit," May 2019 IFIP/IEEE Symposium on Integrated Network and Service Management (IM), pp. 279-288 (2019).

Aghabozorgi et al., "Toward Predictive Handover Mechanism in Software-Defined Enterprise Wi-Fi Networks," 2019 IEEE Sustainability through ICT Summit (StICT), pp. 1-6 (Aug. 2019).

* cited by examiner

DEVICE AND METHOD FOR HOLISTIC STEERING OF STATIONS IN A WIRELESS NETWORK WITH MULTIPLE ACCESS POINTS

CROSS REFERENCE TO RELATED APPLICATIONS

This application is a continuation of U.S. patent application Ser. No. 16/955,479 filed on Jun. 18, 2020 now issued as U.S. Pat. No. 11,368,860 on Jun. 21, 2022, which is the U.S. National Stage, under 35 U.S.C. § 371, of International Application No. PCT/IL2017/051371 filed Dec. 21, 2017 the contents of which are hereby incorporated by reference herein.

TECHNICAL FIELD

The present disclosure relates generally to wireless networks and in particular to wireless networks with multiple Access Points (APs).

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Figure 1:
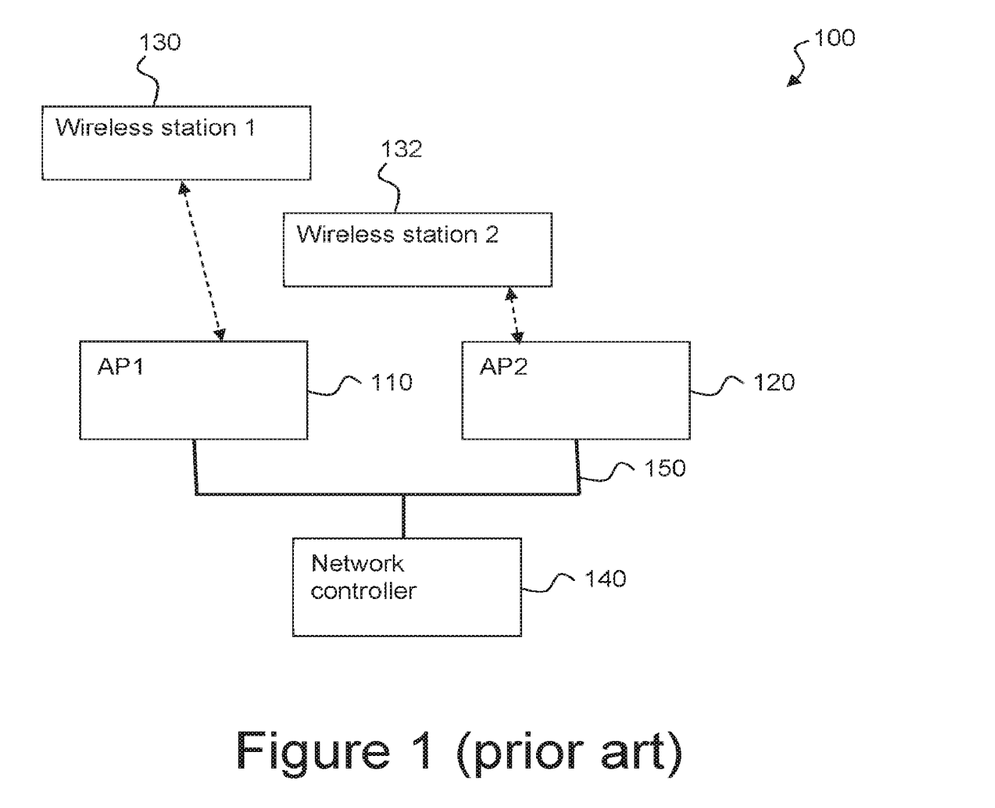
FIG. 1 illustrates a conventional Wi-Fi Protected Access (WPA) Personal protocol.

FIG. 1 illustrates an exemplary conventional wireless local area network (WLAN) 100 with a plurality of wireless Access Points (APs) 110, 120 and two wireless stations 130, 132. The WLAN can for example be a Wi-Fi network compatible with IEEE 802.11 or a Bluetooth® network. The wireless stations 130, 132 can for example be a personal computer, a mobile phone (smartphone) or a tablet.

In such a network, each AP advantageously operates using a channel, i.e. frequencies, distinct from the channel of other network APs in order to avoid interference, the wireless stations 130, 132 each generally being wirelessly connected to a single AP, such as for example AP2 120. As is well known, there may be situations in which it could be preferable to hand over a wireless station to another AP, in this example AP1. Reasons for handing over a wireless station include: load balancing between APs, signal strength problems owing to for instance movement of the wireless station.

Within the network 100, handover (also called 'roaming') can be managed by a WLAN controller 140, which as illustrated may be a standalone device, but which also may be implemented on one of the APs 110, 120. The WLAN 140 and the APs are generally connected in a wired or wireless network 150 illustrated by solid line in FIG. 1.

One of the most important functions of the WLAN controller 140 is to steer, when needed, wireless stations to a better Basic Service Set (BSS), a BSS comprising an AP together with at least one associated wireless station.

Prior to steering a wireless station to a target AP, the WLAN controller should preferably detect suffering wireless stations—i.e. wireless stations with poor quality of service—and choose the best target AP to which a suffering station should be steered.

Detecting wireless stations with poor quality of service can be done using various factors measurable or predictable for the wireless stations, for example signal strength (Received Signal Strength Indication, RSSI), so-called PHY rate (a measure of bandwidth), and medium available (i.e. the ratio, often expressed as a percentage, of time during which no wireless station uses the medium, which therefore is available for any wireless station to start transmitting).

For choosing the target AP, the common conventional solution is to find the AP that is predicted to improve the most the quality of service of the wireless station to roam.

Essentially, conventional solutions detect suffering stations and steers them to APs that should relieve the suffering of these wireless stations, without considering the potential implications of the action on other stations.

A main disadvantage of the conventional solution is that each wireless station is handled separately to try to obtain the maximum benefit for that wireless station only. Steering a wireless station to an alternative AP without evaluation of the impact on the wireless stations already connected to the target AP can lead to new problems as the quality of service of these wireless stations can be degraded.

For example, FIG. 1 illustrates two wireless stations and two APs. Wireless station 1 is connected to AP 1 and wireless station 2 to AP 2. Assuming that the quality of service is poor for wireless station 2, the WLAN controller 140 may decide to roam wireless station 2 to AP 1, However, this may impact the quality of service for wireless station 1 as it after roaming has to share AP 1 with another wireless station.

It will be appreciated that it is desired to have a solution that overcomes at least part of the conventional problems related to roaming of wireless stations in wireless networks with a plurality of access points. The present principles provide such a solution.

SUMMARY OF DISCLOSURE

In a first aspect, the present principles are directed to a device for steering wireless stations in a wireless network with a plurality of access points. The device comprises means for calculating, for each wireless station, a score based on at least an availability of the wireless network for the wireless station, means for combining the scores for the wireless stations into a current network score for a present configuration of the wireless network, means for calculating a plurality of predicted network scores corresponding to predicted network configurations with one wireless station moved to a different access point than in the present configuration, each predicted network score being a combination of the scores for wireless stations not moved in the predicted network configuration and a predicted score for the wireless station moved in the predicted network configuration, means for selecting one of the current network score and the plurality of predicted network scores that satisfies a criterion, and means for moving, in case a predicted network score is selected, a wireless station to match the corresponding network configuration.

Various embodiments of the first aspect include:
  That the device further comprises means for calculating a risk of moving the wireless station to the new access point in each predicted network configuration, and means for calculating a difference between each predicted network score and the current network score, wherein the criterion is a highest ratio between predicted network score and risk, and the means for selecting is configured to select the predicted network score with the highest ratio between predicted network score and risk.

That the criterion is the highest score among the current network score and the plurality of predicted network scores.

That the device further comprises means for implementing preemptive blocking of wireless stations from roaming that would result in network configurations with predicted scores below a threshold value.

That the availability indicates how much a wireless station can increase its data consumption before being limited on its associated access point. The availability can be calculated from at least one of PHY Rate, Data Rate, and Medium Available.

That a score is further based on a current performance of a wireless station compared to its potential across the network.

In a second aspect, the present principles are directed to a method for steering wireless stations in a wireless network with a plurality of access points. At least one hardware processor of a device calculates, for each wireless station, a score based on at least an availability of the wireless network for the wireless station, combines the scores for the wireless stations into a current network score for a present configuration of the wireless network, calculates a plurality of predicted network scores corresponding to predicted network configurations with one wireless station moved to a different access point than in the present configuration, each predicted network score being a combination of the scores for wireless stations not moved in the predicted network configuration and a predicted score for the wireless station moved in the predicted network configuration, selects one of the current network score and the plurality of predicted network scores that satisfies a criterion, and in case a predicted network score is selected, moves a wireless station to match the corresponding network configuration.

Various embodiments of the second aspect include:

That the hardware processor calculates a risk of moving the wireless station to the new access point in each predicted network configuration, and calculates a difference between each predicted network score and the current network score, and the criterion is a highest ratio between predicted network score and risk, and the selecting comprises selecting the predicted network score with the highest ratio between predicted network score and risk.

That the criterion is the highest score among the current network score and the plurality of predicted network scores.

That the hardware processor implements preemptive blocking of wireless stations from roaming that would result in network configurations with predicted scores below a threshold value.

That the availability indicates how much a wireless station can increase its data consumption before being limited on its associated access point. The availability can be calculated from at least one of PHY Rate, Data Rate, and Medium Available.

In a third aspect, the present principles are directed to a computer program comprising program code instructions executable by a processor for implementing the steps of a method according to any embodiment of the second aspect.

In a fourth aspect, the present principles are directed to a computer program product which is stored on a non-transitory computer readable medium and comprises program code instructions executable by a processor for implementing the steps of a method according to any embodiment of the second aspect.

BRIEF DESCRIPTION OF DRAWINGS

Preferred features of the present principles will now be described, by way of non-limiting example, with reference to the accompanying drawings, in which.

DESCRIPTION OF EMBODIMENTS

Figure 2:
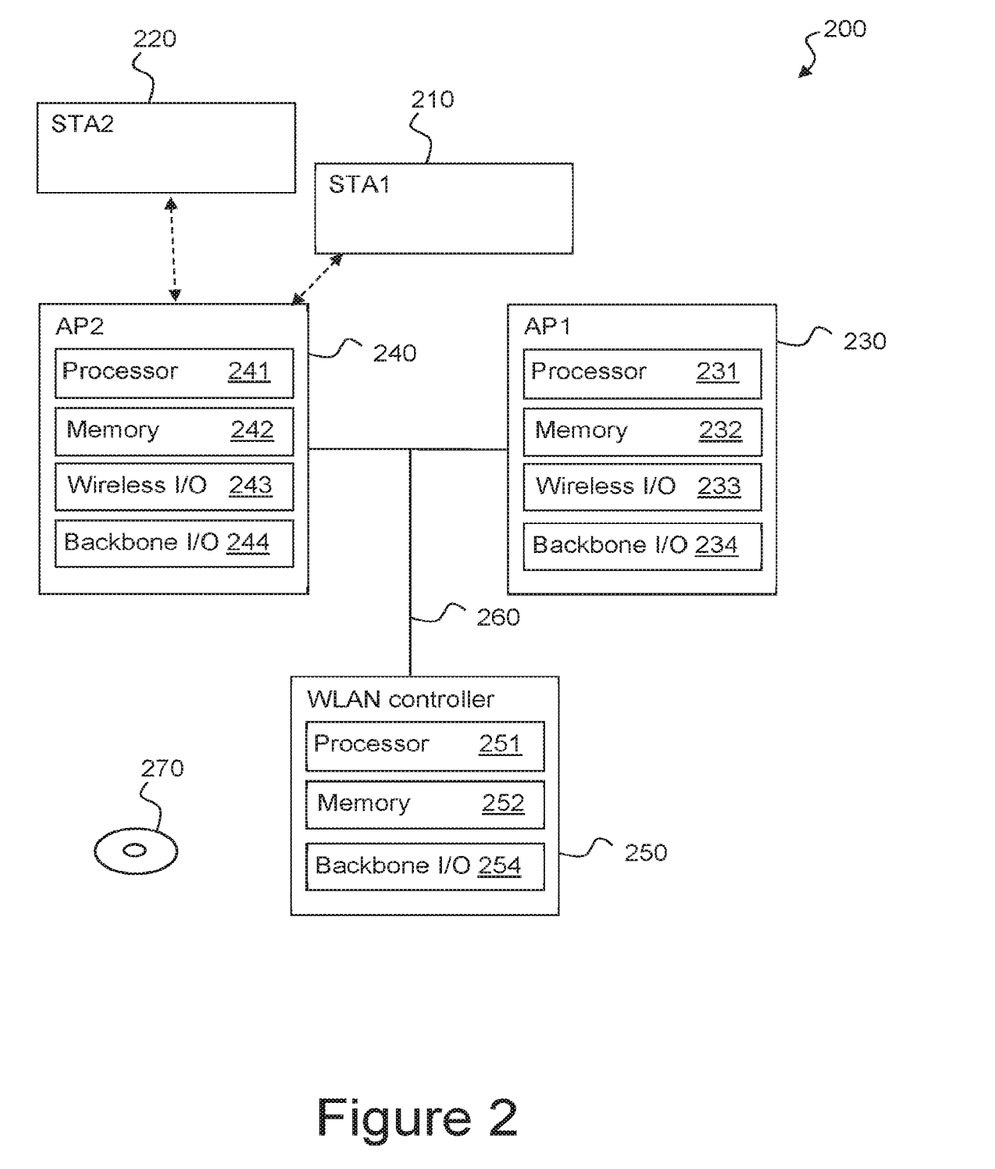
FIG. 2 illustrates an exemplary system according to an embodiment of the present principles.

FIG. 2 illustrates an exemplary system 200 according to an embodiment of the present principles. The system 200 includes a first wireless station (STA1) 210, a second wireless station (STA2) 220, a first access point (AP1) 230 and a second access point (AP2) 240 such as a gateway. The two access points 230, 240 are configured for wireless communication with wireless stations, e.g. using Wi-Fi according to IEEE 802.11. The system 200 further includes a wireless LAN (WEAN) controller 250. The APs 230, 240 and the WLAN controller 250 are connected by a connection 260, which preferably is wired but also can be wireless.

The wireless stations 210, 220 can be any kind of conventional device—mobile phone, tablet, sensor, etc.—compatible with the wireless communications standard used by the APs.

Each AP 230, 240 includes at least one hardware processing unit ("processor") 231, 241, memory 232, 242 and at least one wireless communications interface 233, 243, in the example a Wi-Fi interface, configured to communicate with other wireless stations, and a backbone interface 234, 244 configured for communication with the other devices connected to the connection 260. Any suitable communication standard, such as Wi-Fi (IEEE 802.11), Ethernet (IEEE 802.3), and PLC (power-line communication), could be used for the communication over the connection 260.

The APs 230, 240 are configured to operate on different channels, i.e. different frequencies, so as to avoid interference. The channel allocation, which preferably is dynamic, can be performed in any suitable conventional way.

The WLAN controller 250 can include at least one hardware processing unit ("processor") 251, memory 252 and a backbone interface 254 configured for communication with the other devices connected to the connection 260. The WLAN controller 250 can be a stand-alone devices but it may also be implemented on another device preferably connected to the connection 260 in the system 200, such as on an AP, or in an external network, or in the Cloud.

The system could also include a gateway device (not shown) configured to connect the system 200 to an external network such as the Internet. The gateway device can be a stand-alone device, but it can also be implemented on one of the devices connected to the connection 260, for example an AP.

The memories 232, 242, 252, which can be implemented as a plurality of memory circuits possibly of different types, are configured to store software instructions for execution by the respective processors 231, 241, 251, and also for various data necessary for performing the respective functions described herein.

The skilled person will appreciate that the illustrated devices are very simplified for reasons of clarity and that real devices in addition would include features such as internal connections and power supplies. Non-transitory storage media 270 stores instructions that, when executed by processor 251, perform the functions of the WLAN controller 250 as further described hereinafter with reference to FIG. 3.

As an illustrative example of the current principles, in FIG. 2, STA1 and STA2 are both connected to (i.e. associated with) AP2. Assuming for example that STA1 is located between AP1 and AP2 while STA2 is located far from AP1 but close to AP2. In case the WLAN controller 250 determines that ST2 is suffering, it is likely that it is not possible to relieve its suffering by roaming it to AP1, since AP1 is far away. Using the conventional solutions, STA2 will remain connected to AP2 and continue to suffer.

However, according to the current principles, WLAN controller 250 is configured to consider the network holistically, i.e. as a whole, rather than considering the wireless stations separately. The WLAN controller 250 can thus consider the possibility of roaming STA1 to AP1 in case it predicts improved quality of service for the wireless stations as a group, i.e. if a predicted quality of service after roaming is greater than the present quality of service, as will be described in detail hereinafter. As can be seen, in some cases, the condition of a suffering wireless station can be improved only by steering another wireless station (which may experience perfect conditions) to an alternative AP.

In a preferred embodiment of the present principles, the WLAN controller 250 is configured to find the single steering action that, according to predictions of the WLAN controller 250, improve the network performance the most (the holistic approach), i.e. for which the quality of service as a whole for the wireless stations in the network is improved the most. The skilled person will appreciate that this is different from the conventional solution of trying to improve the quality of service for each station separately (the soloist approach).

The WLAN controller 250 is thus configured to evaluate, preferably in a continuous manner, the quality of service of the wireless stations, as described hereinafter, and to evaluate (preferably all) possible steering actions to find the steering action that is predicted to improve the quality of service in the network the most.

The quality of service of a wireless station can be calculated as a score calculated from at least one, preferably all, of the following metrics:

Availability metric: this indicates how much the wireless station can increase its data consumption before being limited on its associated AP. The availability metric can be based on any measurable characteristic indicating the likelihood to achieve the full transmission potential. For example, the availability metric can be calculated from standard used, the PHY Rate, the Data Rate, and the Medium Available, the interference, the short versus long guard interval and the channel width. The standard, for instance, provides information on the maximum possible PHY rate, while higher interference means lower throughput.

As an example, the availability metric for a wireless station that is consuming half the medium available to it could be expressed as 50%, meaning that it can double the throughput without hitting its transmission limits.

As a further example, a wireless station that is consuming 1 mbps out of a free channel with a maximum PHY rate of 400 mbps would have an availability metric of close to 100, which means it has little or no need for improvement. In this case, even if the wireless station could roam to a better AP, this is not needed if it has a high availability metric.

Link metric: this indicates the how 'wasteful' the station is on its current link to its AP, i.e. the fraction or percentage of the maximal PHY rate that is used. When the PHY rate is lower than the maximum, the wireless station is using more air time for each bit of data transmitted than it would under ideal circumstances when the PHY rate is maximal. A low link metric can be said to make things worse for other wireless stations connected to the AP (as network resources are wasted), even though the wireless station itself may not be suffering from it.

Experience metric: this indicates the current performance of a wireless station compared to its potential across the network 200. This metric can take various factors into account, such as the wireless station's capabilities, the actual PHY rate, the medium available on the channel, and the potential maximum PHY rate on other APs in the network 200.

For example, a dual-band wireless station connected to a 2.4 GHz radio with 100% medium available and 100% of the max PHY rate would not necessarily obtain an experience metric value of 100. This would be the case if the 5 GHz radio could provide a bandwidth many times higher, such as 130 mbps vs. 866 mbps. In this case, it could make sense to steer the wireless station to the 5 GHz radio.

However, another wireless station, which is not dual band, that is connected to the same 2.4 GHz radio but cannot go to the 5 GHz radio should have an experience an experience metric value of 100 since its situation is as good as it can be in the network.

The quality of service in the network is preferably obtained by combining the current scores for the quality of service of all the wireless stations in the network into a current network score. A predicted network score is calculated for each alternative network state (i.e. the network configuration after each evaluated steering action) by combining predicted scores for each wireless station in the network after the wireless station roams.

A network score can be calculated by taking the average of the scores of the wireless stations 210, 220 in the network 200 and the complement of the standard deviation of the scores of the wireless stations.

A predicted network score can be calculated using estimated scores for the mobile devices, the estimated scores being calculated from estimated metrics for each mobile device. The estimated metrics can be calculated as the measured metrics, but using predicted values, in themselves well-known in the art, instead of measured values. For example, for the availability metric, the estimated PHY rate can be calculated from the estimated RSSI (using for example a beacon report) and the estimated medium available based on the air-time prediction of the simulation of the roaming wireless station.

As an example, in network 200 in FIG. 2 a current network score can be calculated by combining current scores for STA1 connected to AP2 and STA2 connected to AP2 (i.e. the current configuration). Possible steering actions are: steering STA1 to AP1 and steering STA2 to AP1. Predicted network scores can thus be calculated for the following network configurations: STA1 connected to AP1 and STA2 connected to AP2, and STA1 connected to AP2 and STA2 connected to AP1.

If one of the predicted network scores is better than the current network score, then the WLAN controller can steer a wireless station to a new AP.

The skilled person will appreciate that the present principles can readily be extended beyond single steering actions to consider the effects of multiple essentially simultaneous steering actions.

The load balance in the network can be included in the network score. This enables the WLAN controller 250 to attempt to keep the allocated resources, i.e. the resources provided by the APs, balanced, which for example can make the network 200 more robust to changes.

The WLAN controller 250 can further be configured to limit the score degradation for the wireless stations. In other words, the WLAN controller 250 will not select a roaming action that improves the network score in case the roaming action also degrades the score for at least one wireless station by at least a given amount. This can ensure fairness meaning that no wireless station is sacrificed for the benefit of the other mobile devices in the network, although it is noted that it is also possible to prioritize a first wireless station over a second wireless station and in this case sacrifice the second wireless station for the first wireless station.

The WLAN controller 250 can further be configured to validate that the selected roaming action will result in an improved network state by verifying that the corresponding predicted network score is stable and not transient. This can be achieved by recalculating the predicted network score at least once during a predetermined period, for example a few seconds, before steering the wireless station to the new AP.

In addition, the WLAN controller 250 is preferably further configured to reduce the risks in the network 200. This can be done in one or more of the following ways:
- Limiting one steering action at a time, i.e. steering only one station at a time. A reason for this is that a steering action may fail, which means that improving the network performance step by step is more predictable.
- Preferring to steer a wireless station with a relatively higher probability of successful roaming to a wireless station with a relatively lower probability, particularly in case the predicted score improvements are equal or different by no more than a certain amount.
- Preferring to steer a wireless station based on supported capabilities, for example, in the 802.11 protocol, prefer to steer a wireless station compatible with the 802.11v protocol (typically not supported by legacy wireless stations) than wireless stations incompatible with this protocol.
- Selecting a new predicted network state only if it's significantly better, i.e. by a predetermined amount, than the current network state. A reason for this is that it avoids steering actions that can be risky for an improvement that is small.

Furthermore, the WLAN controller 250 can also use the predicted network scores for preemptive blocking, i.e. to stop a wireless station from roaming to a new AP on its own accord (rather than being steered by the network) in case such roaming would degrade the predicted network score for the network configuration after roaming by at least a certain amount (that can be as low as zero). The skilled person will appreciate that conventional preemptive blocking only considers that state for the wireless station that wishes to roam, while preemptive blocking according to the present principles considers that state of the whole network.

Figure 3:
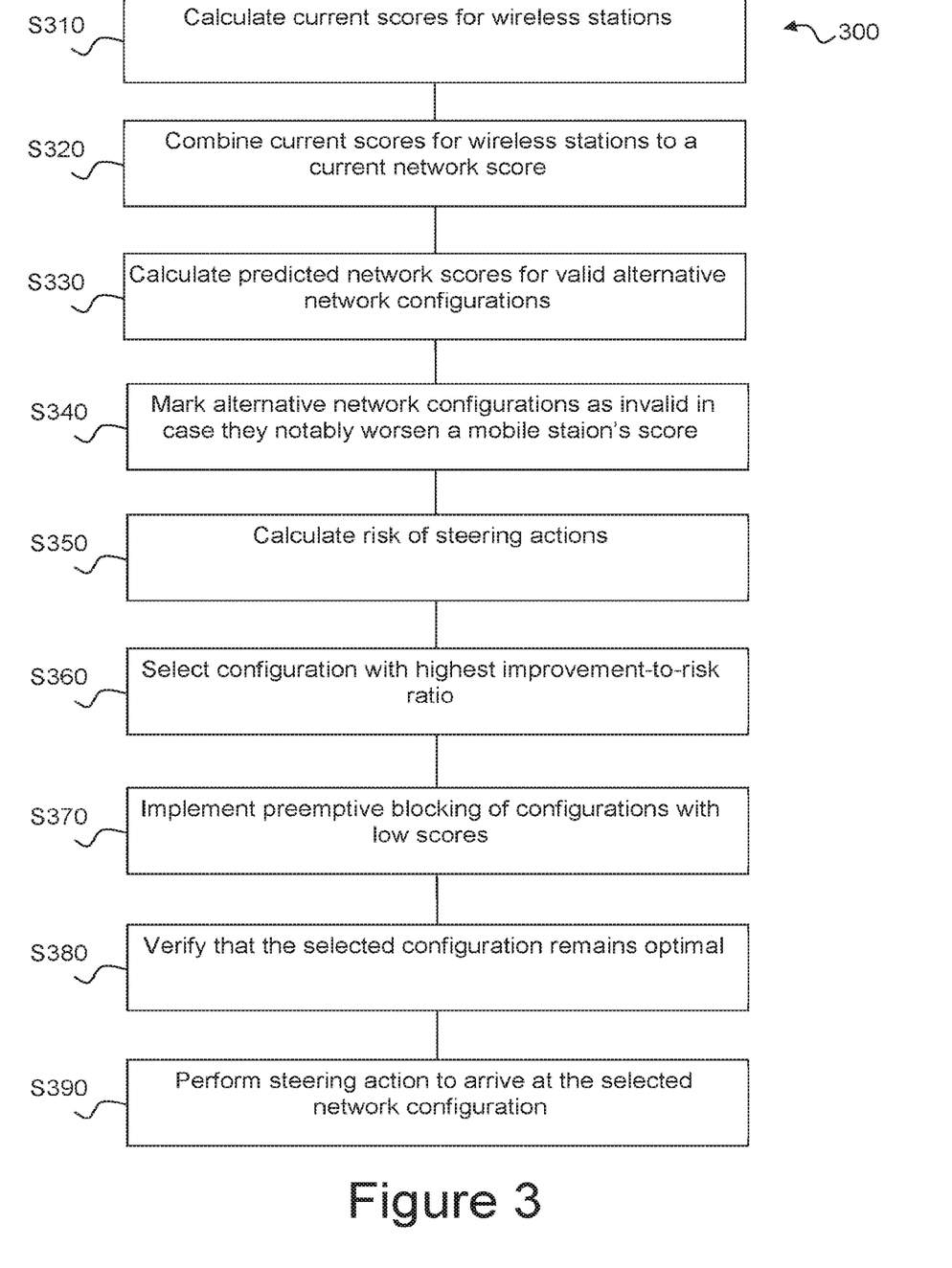
FIG. 3 illustrates an exemplary method for according to an embodiment of the present principles.

FIG. 3 illustrates an exemplary method of improving the state of a network. The method is performed by the processor 251 of the WLAN controller 250.

In step S310, a current score is calculated, as already explained, for each wireless station in the network. In step S320, the scores of the wireless stations are combined into a current network score, as already explained.

In step S330, predicted network scores are calculated, as already described by combining estimated scores for the wireless stations, for at least one, preferably all, valid alternative network configurations. As already mentioned, it is preferred that a valid alternative network configuration corresponds to a network configuration following one steering action for one wireless station.

In step S340, an alternative network configuration is marked as invalid in case it results in a degradation greater than a given value for any wireless station.

In step S350, a risk of the possible steering actions is calculated. based on the station's capabilities or any other available information. If a station for example does not respond correctly to 802.11v, then this is a risk to be considered. Also, the result—success or failure—of previous steering actions in the network provides an indication of the risk; to this end, statistics for steering actions could be collected and used.

In step S360, the alternative network configuration with the highest ratio between improvement of the network score to risk is selected. Put another way, the ratio is calculated as $$\frac{\text{Predicted network score} - \text{current network score}}{\text{risk}}$$

In step S370, network configurations with scores beneath a threshold value are identified, and preemptive blocking is configured for all cases by setting an ACL DENY rule on the AP for the wireless station for which the decision applies. In order to clear previous blackings, all other options are allowed.

In step S380, it is verified that the selected network configuration is optimal. This can be done by repeating previous steps until the same network configuration is selected at least a given number of times within a time window (for example: N times out of the latest N+M times).

In step S390, the steering action to arrive at the selected network configuration is performed, i.e. a wireless station is steered to arrive at this configuration.

As will be appreciated, the present principles can take a holistic view of the wireless network to improve the quality of service for the mobiles stations in the network as a group. This can for example improve the quality of service of a wireless station by steering another wireless station to another access point.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A device for steering wireless stations in a wireless network with a plurality of access points, the device comprising:
a processor connected to a communications interface, the processor and communications interface configured to:
calculate, for each wireless station of a plurality of wireless stations in the wireless network, a score based on at least an availability metric of each wireless station of the wireless stations;
combine the calculated scores for the plurality of wireless stations into a current network score for a present network configuration of the wireless network, wherein network configuration refers to which wireless stations are associated with which of the plurality of access points;
calculate a predicted network score for each of a plurality of potential network configurations, wherein each potential network configuration includes a set of wireless stations of the plurality of wireless stations located at a different access point compared to the present network configuration, wherein the set of wireless stations comprises at least two wireless stations, wherein each predicted network score is a combination of a predicted score for each of the plurality of wireless stations in a respective potential network configuration;
select one of the plurality of potential network configurations based on a corresponding predicted network score that satisfies a criterion; and
steer each wireless station of the set of wireless stations to a same or a different access point based on the selected potential network configuration.

2. The device of claim 1, wherein the processor and communications interface are further configured to:
calculate a risk of moving the set of wireless stations to the different access point in each of the plurality of potential network configurations based on each wireless stations capabilities or history of being moved;
calculate a difference between each predicted network score and the current network score of the current network configuration; and
wherein the criterion is achieving a highest ratio between a predicted network score and a risk.

3. The device of claim 1, wherein the criterion is a highest positive difference between each predicted network score and the current network score of the current network configuration.

4. The device of claim 1, wherein the processor and communications interface are further configured to implement preemptive blocking of wireless stations from roaming to an access point in the wireless network that would result in one or more network configurations with predicted network scores below a threshold value.

5. The device of claim 1, wherein the predicted network score for each of the wireless stations is based on an availability metric that indicates how much a wireless station can increase its data consumption before being limited on its associated access point.

6. The device of claim 5, wherein the availability metric is calculated from at least one of PHY Rate, Data Rate, and Medium Available.

7. The device of claim 1, wherein the predicted network score for each of a plurality of network configurations is further based on a load balance across the network in a given network configuration.

8. A method for steering wireless stations in a wireless network with a plurality of access points, the method comprising:
calculating, for each wireless station of a plurality of wireless stations in the wireless network, a score based on at least an availability metric of each wireless station of the wireless stations;
combining the calculated scores for the plurality of wireless stations into a current network score for a present network configuration of the wireless network, wherein network configuration refers to which wireless stations are associated with which of the plurality of access points;

calculating a predicted network score for each of a plurality of potential network configurations, wherein each potential network configuration includes a set of wireless stations of the plurality of wireless stations located at a different access point compared to the present network configuration, wherein the set of wireless stations comprises at least two wireless stations, wherein each predicted network score is a combination of a predicted score for each of the plurality of wireless stations in a respective potential network configuration;

selecting one of the plurality of potential network configurations based on a corresponding predicted network score that satisfies a criterion; and steering each wireless station of the set of wireless stations to a same or different access point based on the selected potential network configuration.

9. The method of claim 8, further comprising:

calculating a risk of moving the set of wireless stations to the different access point in each of the plurality of potential network configurations based on each wireless stations capabilities or history of being moved;

calculating a difference between each predicted network score and the current network score of the current network configuration; and wherein the criterion is achieving a highest ratio between a predicted network score and a risk.

10. The method of claim 8, wherein the criterion is a highest positive difference between each predicted network score and the current network score of the current network configuration.

11. The method of claim 8, further comprising implementing preemptive blocking of wireless stations from roaming to an access point in the wireless network that would result in one or more network configurations with predicted network scores below a threshold value.

12. The method of claim 8, wherein the predicted network score for each of the wireless stations is based on an availability metric that indicates how much a wireless station can increase its data consumption before being limited on its associated access point.

13. The method of claim 12, wherein the availability metric is calculated from at least one of PHY Rate, Data Rate, and Medium Available.

14. The method of claim 8, wherein the predicted network score for each of a plurality of network configurations is further based on a load balance across the network in a given network configuration.

* * * * *